C. J. CUNNINGHAM.
MACHINE FOR SPREADING LIME AND THE LIKE.
APPLICATION FILED OCT. 10, 1912.
1,065,665.
Patented June 24, 1913.
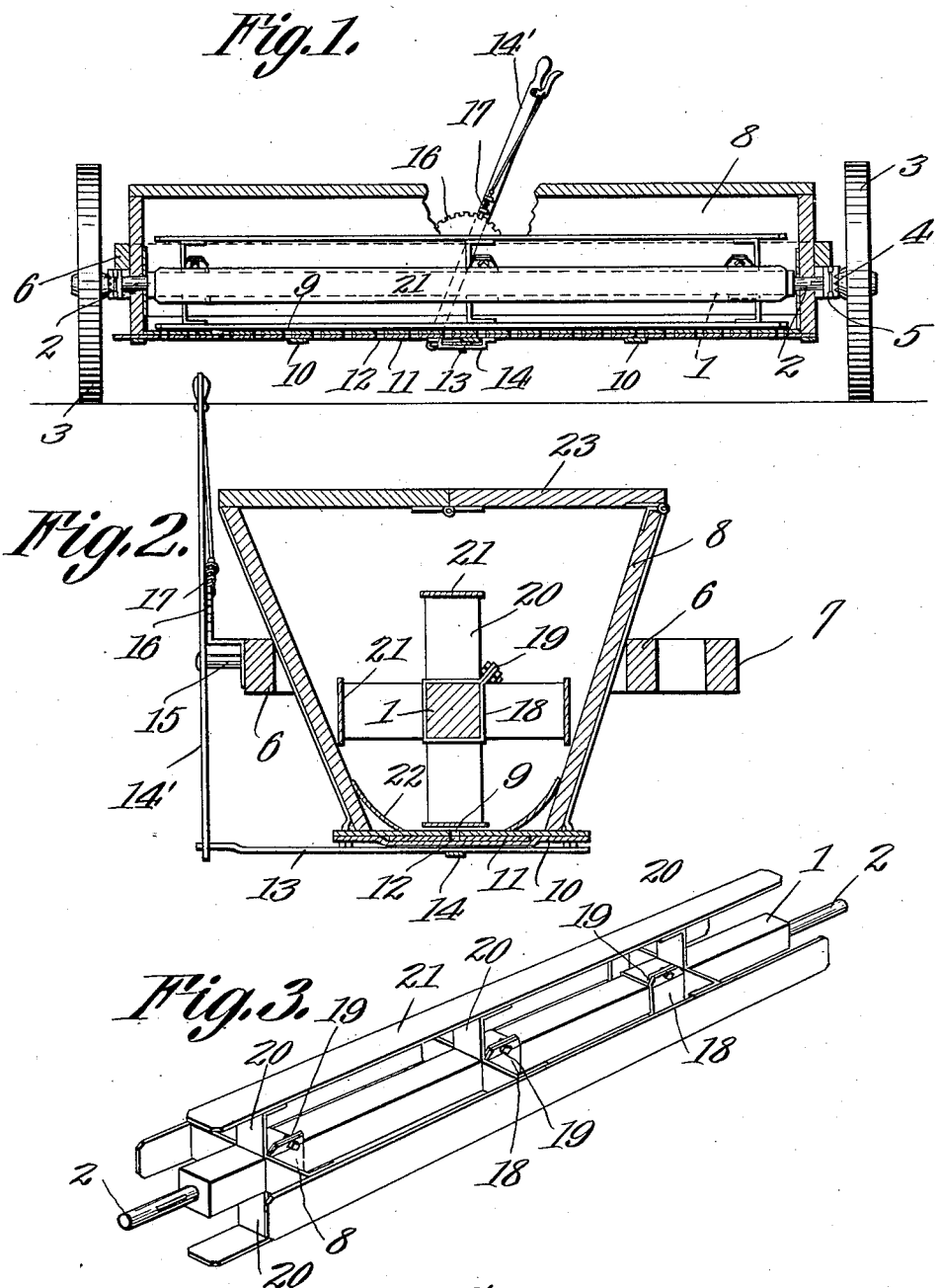

UNITED STATES PATENT OFFICE.

CLEMENT J. CUNNINGHAM, OF MOUNT VERNON, ILLINOIS.

MACHINE FOR SPREADING LIME AND THE LIKE.

1,065,665.  Specification of Letters Patent.  Patented June 24, 1913.

Application filed October 10, 1912. Serial No. 725,079.

*To all whom it may concern:*

Be it known that I, CLEMENT J. CUNNINGHAM, a citizen of the United States, residing at Mount Vernon, in the county of Jefferson and State of Illinois, have invented a new and useful Machine for Spreading Lime and the Like, of which the following is a specification.

This invention relates to machines for spreading lime over the surface of the ground for use as fertilizer, although it is to be understood that the device can be used for spreading other materials if desired.

One of the objects of the invention is to provide a machine particularly designed for spreading material which cannot be discharged from ordinary types of fertilizer distributers because of its tendency to pack and become hard. Great difficulty has heretofore been experienced in distributing crushed limestone, lime, and the like for the reason that it soon packs into a solid mass and cannot be readily discharged in a definite quantity.

One of the objects of this invention is to provide simple means for discharging such materials, said means being constantly under the control of the operator.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a vertical longitudinal section through the box or receptacle of the machine constituting the present invention, the cut-off mechanism being shown in section and the agitating means being shown in elevation. Fig. 2 is an enlarged transverse section through the structure shown in Fig. 1. Fig. 3 is a detail view of the agitator.

Referring to the figures of the drawings by characters of reference 1 designates an axle angular in cross sectional contour and having spindles 2 extending from the ends thereof and engaged by supporting wheels 3. Each of the supporting wheels has a clutch member 4 upon the hub thereof and adapted to be engaged by another clutch member 5 which is feathered on the adjacent spindle 2. Obviously by shifting the clutch member 5 into engagement with the clutch member 4 the wheel will be coupled to the axle and will cause said axle to rotate therewith.

A frame 6 is loosely engaged by the spindles 2 and may be provided with a draft tongue 7 or the like extending forwardly therefrom. Secured to this frame is a hopper-like box or receptacle 8 and the axle is arranged longitudinally within this box. The bottom of the box is formed with a series of outlet openings 9 and arranged under the bottom of the box are guide straps 10 in which a slide 11 is supported. This slide is likewise provided with apertures, such as shown at 12 and which are adapted to move into or out of register with the apertures 9.

A lever 13 is pivotally connected at its front end to the front edge portion of the bottom of the box 8 preferably close to the center thereof and this lever extends rearwardly through and is pivotally connected to a bracket 14 secured to the slide 11. The rear end of lever 13 is engaged by the lower end of a lever 14', said lever being fulcrumed on a bracket 15 extending rearwardly from the box 8. A toothed segment 16 may be mounted on the bracket 15 so as to be engaged by a spring pressed dog 17 carried by lever 14'. Thus it will be seen that when lever 14' is swung to the right or to the left, motion will be transmitted therefrom through lever 13 to slide 11, and said slide will therefore be moved longitudinally so as to simultaneously close the openings 9 or partly or entirely open them.

Mounted upon the angular portion of the axle 1 are collars 18 each of which is preferably formed in a single length of metal folded around the axle and having terminal ears 19 bolted together. Arms 20 extend radially from the collar and are bolted or otherwise secured to scraping blades 21 which are parallel with the axle 1 and extend practically throughout the length of the box 8.

The bottom of the box 8 is provided with guide plates 22 which are curved downwardly from the front and back walls of the box toward the row of openings 9. The box 8 is provided with closures 23 preferably hingedly connected to each other and to one wall of the box.

In using the device herein described the box 8 is partly or entirely filled with the lime or other material to be distributed. When the machine is drawn forward, motion will be transmitted from one of the wheels 3 to the axle 1 provided the clutch members 4 and 5 are in engagemnt with each other. The blades 21 will thus travel in a circle within the box 8 and will move close to the guide plates 22 and to the openings 9. The material will thus be agitated and will be directed through the openings 9 and onto the ground, the amount of material discharging through the openings being controlled by the cut-off slide 11.

By utilizing a machine such as herein described the material distributed will be prevented from packing into a hard mass and will discharge free through the openings 9.

What is claimed is:—

1. The combination with an angular wheel supported axle mounted for rotation, of a receptacle supported by the axle, said axle extending longitudinally through the receptacle, there being outlet openings in the bottom of the receptacle, means for controlling the discharge of material through the openings, bands wrapped about the axle and having their ends detachably secured to clamp the bands upon the axle, arms radiating from the bands, and agitating blades connected to the arms and parallel with the axle, each blade lying in a plane disposed at a tangent to the path of movement of the outer terminals of the arms, said blades being adapted to assume positions parallel with the bottom of the receptacle during the rotation of the blades and axle.

2. The combination with a wheel supported axle mounted for rotation, of a receptacle supported by the axle, said receptacle having outlet openings in the bottom thereof, means for controlling the discharge of material through the openings, bands clamped around the axle and detachably mounted thereon, each band including terminal ears and means for detachably securing the ears together, arms radiating from the bands, and agitating strips or blades connecting the arms and parallel with the axle, said blades being movable close to the outlet openings.

In testimony that I claim the foregoing as my own, I have hereto affixed my signature in the presence of two witnesses.

CLEMENT J. CUNNINGHAM.

Witnesses:
A. D. WEBB,
W. A. VIEHE.

---

Copies of this patent may be obtained for five cents each, by addressing the "Commissioner of Patents, Washington, D. C."